F. M. Willson.
Horse Hay-Fork.
Nº 76868      Patented Apr. 14, 1868.
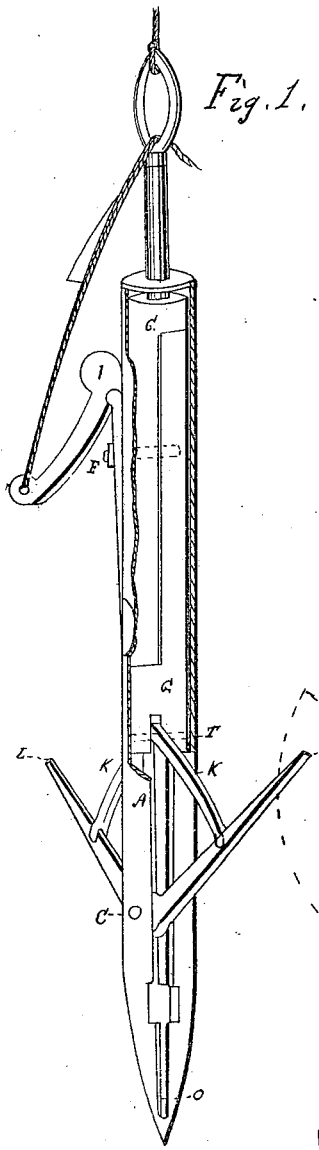
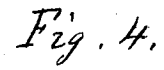
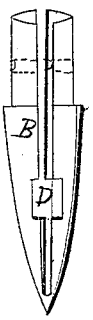
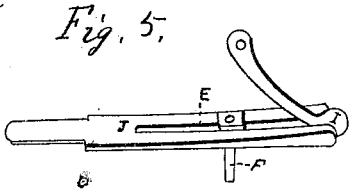
Witnesses
Inventor
Franklin M. Willson

United States Patent Office.

FRANKLIN M. WILLSON, OF WHITNEY'S POINT, NEW YORK, ASSIGNOR TO HIMSELF AND ISAAC G. DUNDORE, OF SAME PLACE.

Letters Patent No. 76,868, dated April 14, 1868.

IMPROVEMENT IN HORSE HAY-FORKS.

The Schedule referred to in these Letters Patent and making part of the same.

TO ALL WHOM IT MAY CONCERN:

Be it known that I, FRANKLIN M. WILLSON, of Whitney's Point, in the county of Broome, and State of New York, have invented a new and useful Improvement on Hay-Elevators; and I do hereby declare that the following is a full, clear, and exact description of the construction and operation of the same, reference being had to the accompanying drawings, in which—

Figure 1 is a perspective view representing the elevator suspended, with a portion of the sheath removed, showing the interior arrangement.

Figure 2 is the detached pointed end of the sheath.

Figures 3 and 4 are the detached parts of the rod, to the lower end of one of which are attached the tines for holding the load.

Figure 5 represents the attaching and detaching-spring, and eccentric-tumbler by which it is operated.

Similar letters of reference indicate corresponding parts in each figure.

The nature of my invention consists in the employment of a cylindrical sheath, in which works a rod made of two detachable parts, operating two expanding tines, the points of which, when closed, form the pointed end of the sheath, and, when pressed into the hay, the drawing up of which will cause the tines to project, taking all the hay with them from the point of the sheath to the length of the expanded tines, when it may be elevated, and disengaged by means of a cord attached to a spring-lock, the operation of which will close the tines.

To enable others to make and use my invention, I will proceed to describe its construction and operation.

I construct the sheath A of iron or other suitable material, in cylindrical form, and affix to the lower end a separate piece, B, tapering to a point, by turning down the connection-end, leaving a shoulder, so that, when attached, the two parts will be flush with each other, and secure them in position by a screw, C, which also answers the purpose of a joint-pin for the tines to work on. I then make a vertical slot, D, through the centre, extending from the top nearly to the point, of sufficient length and breadth for a recess to admit the tines, so that, when closed, they may not obstruct the entrance of the sheath into the hay. I also make a vertical slot, E, in the side of the main part of the sheath, for the attach and detach pin or key F to work in. I then make an aperture through the top or cover of the cylinder or sheath for the handle of the rod G to work in. This rod I make in two parts, halving and lapping it together. Near the upper end, I make a hole through both parts for the key or pin F, which connect and disconnect the two parts of the rod by means of an eccentric-tumbler, I, attached to a connecting-spring, J, which spring I secure to the side of the sheath by a dove-tail slide. I make a slot in this spring to correspond with the vertical slot E in the side of the cylinder, over which it is placed. To the lower end of the rod G, I attach two connecting-arms K K, which are fastened to and work on a pin, $i$, through its centre and near the end. The other ends of these arms are jointed to the tines L L, a little below their main joint-pin C, which being stationary, the tines are expanded and contracted by the up-and-down movement of said rod.

For the purpose of suspending the elevator, I attach a ring to the end of the handle by means of a nut and screw. I also fit a spring-guard, O, with a groove in the end for a guide to the detaching-cord. This is secured in place by the same nut and screw. When I use my invention, I suspend the elevator by the horse-rope over the pulley, then press the pointed end into the hay the required depth. When it is raised by the horse, the upward motion expands the tines, taking the hay with them from the point of the elevator to their expanded length, and when raised to the desired height, a pull of the detaching-cord draws up the eccentric-tumbler I, which raises the spring J, thereby drawing out the key or pin F from the hole P in the lower part of the rod G, which disengages the load. The eccentric-tumbler is then turned down, and the upper part of the rod, now disconnected, pushed into the sheath until the key or pin enters the hole P by means of the spring J, when it is again ready for use.

I am aware that there are other hay-elevators that are similar in some respects to my improvement, but they are differently constructed, and less efficient in their operation. In my invention, I have obviated many practical difficulties that others are subject to; and some of its advantages over others are, first, it takes the hay from the lowest point of its entrance; second, it can be made of any length; third, the tines are expanded and the hay elevated by the same operation.

Having thus described my invention, what I claim, and desire to secure by Letters Patent, is—

1. The combination and arrangement of the compound detachable rod G with the tines L L, opening from and closing into the recess D, so that, when closed, their points will meet near the pointed end of the part B, and when opened or expanded, will operate as herein described.

2. Constructing the sheath A, with the detachable pointed end B, in combination with the spring J, tumbler I, pin or key F, hole P, and joint-pin C, all being constructed substantially as herein described and represented for the purpose set forth.

FRANKLIN M. WILLSON.

Witnesses:
DAYTON CHURCH.
ISAAC T. STODDARD.